(12) United States Patent
De Rossi et al.

(10) Patent No.: US 8,186,829 B2
(45) Date of Patent: May 29, 2012

(54) PROGRESSIVE OPHTHALMIC LENS

(75) Inventors: Helene De Rossi, Charenton le Pont (FR); Natalia Dobrescu, Charenton le Pont (FR); Sara Marie, Charenton le Pont (FR)

(73) Assignee: Essilor International (Compagnie Generale D'optique), Charenton le Pont (FR)

( * ) Notice: Subject to any disclaimer, the term of this patent is extended or adjusted under 35 U.S.C. 154(b) by 78 days.

(21) Appl. No.: 12/747,264

(22) PCT Filed: Dec. 9, 2008

(86) PCT No.: PCT/FR2008/052256
§ 371 (c)(1),
(2), (4) Date: Jun. 10, 2010

(87) PCT Pub. No.: WO2009/080979
PCT Pub. Date: Jul. 2, 2009

(65) Prior Publication Data
US 2010/0321633 A1    Dec. 23, 2010

(30) Foreign Application Priority Data

Dec. 11, 2007 (FR) ..................................... 07 59715

(51) Int. Cl.
G02C 7/06 (2006.01)
(52) U.S. Cl. ......................... 351/169; 351/161; 351/168
(58) Field of Classification Search .................. 351/161, 351/164, 168, 169, 170
See application file for complete search history.

(56) References Cited

U.S. PATENT DOCUMENTS

| | | | |
|---|---|---|---|
| 4,537,479 | A | 8/1985 | Shinohara et al. |
| 7,033,022 | B2 | 4/2006 | Dorsch et al. |
| 7,207,674 | B2 * | 4/2007 | Bourdoncle et al. ......... 351/169 |
| 7,207,675 | B1 | 4/2007 | Chauveau et al. |
| 2006/0262270 | A1 | 11/2006 | Bourdoncle et al. |
| 2007/0242217 | A1 | 10/2007 | Carimalo et al. |
| 2010/0283963 | A1 * | 11/2010 | Giraudet et al. ............. 351/169 |

FOREIGN PATENT DOCUMENTS

| | | |
|---|---|---|
| EP | 0911672 | 4/1999 |
| EP | 1744202 | 1/2007 |
| EP | 1783533 | 5/2007 |
| FR | 2522241 | 3/1985 |
| FR | 2871248 | 12/2005 |
| FR | 2884325 | 10/2006 |

OTHER PUBLICATIONS

Stefanie Schuldt "ysis—natürliches sehen erleben" Deutsche Optiker Zeitung. May 1, 2004. pp. 38-43. (XP002398937).

* cited by examiner

*Primary Examiner* — Darryl J Collins
(74) *Attorney, Agent, or Firm* — Occhiuti Rohlicek & Tsao LLP

(57) ABSTRACT

The invention provides a progressive ophthalmic lens suitable to be worn by a person engaged in a sporting activity. For this purpose the lens has a far vision region which is enlarged, and a peripheral field of vision which is separated and whose mean sphere gradients are gentle. When a progressive lens of this kind is allocated to a wearer, the lens can have an addition value that is approximately equal to a prescribed value, or an addition value that is less than the prescribed value.

13 Claims, 6 Drawing Sheets

PROGRESSIVE OPHTHALMIC LENS

CROSS-REFERENCE TO RELATED APPLICATIONS

This Application is the National Stage of International Application No. PCT/FR2008/052256, filed on Dec. 9, 2008, which claims the priority of French Application No. 0759715 filed on Dec. 11, 2007, the contents of which are incorporated herein by reference in their entirety.

BACKGROUND OF THE INVENTION

The present invention relates to a progressive ophthalmic lens suitable for undertaking a sporting activity. It also relates to a method of producing such a lens intended for an identified wearer.

The use of vision when undertaking a sporting activity may have characteristics that differ from those prevailing during everyday life. In particular, far vision and vision of the ground are very greatly used when undertaking many sports, whereas near vision is employed very little or not at all. Examples that may be mentioned are golf, jogging, tennis, cycling, etc. Possibly, near vision may be used for a limited period, such as for example for consulting a mobile telephone, for reading a map or for noting one's golf score. However, the sportsman then fixes his gaze on the mobile telephone or his map only for a short period, just sufficient to read the desired information.

Thus, very many sports require the sportsman to survey a wide visual range. For example, a golfer must be able to follow the movement of his ball, and a cyclist must not be impeded by optical distortions that might appear in the peripheral area of his visual field. To do so, it is advantageous for the sportsman to have a dynamic peripheral vision of high quality.

As is known, a progressive spectacle lens corrects the vision of a person wearing said lens for far vision differently than for near vision. Such a lens therefore provides a permanently adapted ophthalmic correction, whether the wearer looks at a far object or a near object. To do this, the lens has an optical power that varies continuously between two areas of the lens, which are dedicated to far vision and to near vision respectively. However, this variation in the optical power inherently produces an unintentional astigmatism laterally limiting the far vision and near vision areas of the lens. Because of this, it is known to adapt the design of a progressive lens according to the wearer's main activity, in order to reduce any impediment that could cause this unintentional astigmatism. For example, certain progressive lens designs have been proposed which are more adapted for working with a computer screen, while others are more adapted for driving a motor vehicle. However, undertaking a sport, such as one of those mentioned above, may require a different adaptation of the design of a progressive lens.

Thus, progressive lenses are already proposed commercially of which the design is more particularly adapted for sporting activity. These lenses have an especially enlarged far-vision area. However, this adapted is still insufficient in relation to the requirement for a wide far-vision field and good vision of the ground felt when certain sports are being undertaken.

Document U.S. Pat. No. 7,033,022 describes a particular design of progressive ophthalmic lens that possesses a very wide far-vision area. This extended area is also dedicated to intermediate vision, thereby enabling objects located at distances equal to or greater than one meter to be observed clearly by the wearer, without him moving his head. However, such a lens possesses a near-vision area in which the optical power increases continuously in the lower portion of the lens, right to the lower edge thereof. At the same time, the lens described in the above document has an area devoid of unintentional astigmatism with a width that decreases continuously between the far-vision area and the lower edge of the lens. For this reason, the design of such a progressive ophthalmic lens is referred to as a "funnel" design. The near-vision conditions that are provided by such a lens are therefore not very comfortable, especially because the wearer may have difficulties in finding that point on the lens which gives him sharp vision of a close object. Certain particular situations may even force the wearer to adopt a painful and tiring position in order to achieve satisfactory near vision.

Document EP 1 744 202, in the name of the Applicant, provides a progressive ophthalmic lens which comprises a complex surface, a prism reference point and a fitting cross, and which is suitable for being placed in front of a wearer's eye in such a way that a scan along the wearer's line of sight through the lens defines a meridian line corresponding to a trace of the line of sight intersecting with the surface. The meridian line connects an upper edge to a lower edge of the lens, passing through a far-vision reference point, the fitting cross, the prism reference point and a near-vision reference point. The fitting cross and the near-vision reference point are located at 4 mm above the prism reference point and at 14 mm below said point, respectively. The complex surface has a power addition between the far-vision and near-vision reference points and limited values for the following quantities: the cylinder normalized to the addition; the rebound in the mean sphere normalized to the addition; and the progression length. In the context of the present application, a value which is normalized to the addition means that what is considered is the quotient resulting from this value divided by the addition.

It will be recalled that the mean sphere and the cylinder of a complex surface, estimated at a point thereon, are given by the following formulae respectively:

$$Sph = \frac{n-1}{2} \times \left[\frac{1}{R1} + \frac{1}{R2}\right] \quad (1a)$$

$$Cyl = (n-1) \times \left|\frac{1}{R1} - \frac{1}{R2}\right| \quad (1b)$$

in which n is the light refraction index or refractive index of the material of the lens at the point in question and R1 and R2 denote the radii of maximum and minimum curvature of the complex surface at the same point, these being measured in two perpendicular directions. Furthermore, the progression length is defined as the distance measured vertically on the complex surface of the lens between the fitting cross and a point on the meridian line for which the mean sphere has a difference equal to 85% of the addition in relation to the far-vision reference point.

However, the visual comfort provided by a lens as described in EP 1 744 202 may be insufficient when the person wearing this lens is undertaking a sporting activity.

SUMMARY OF THE INVENTION

The object of the present invention is therefore to provide improved comfort for a person wearing a progressive ophthalmic lens, particularly when he is undertaking a sporting activity.

To do this, the invention provides a progressive ophthalmic lens, the complex surface of which has the following characteristics:

- a cylinder value, normalized to the addition, which is less than 1.0 over the entire complex surface of the lens;
- a mean sphere normalized to the addition, which has no rebound on a circle of radius 20 mm centered on the prism reference point;
- a progression length which is less than or equal to 15 mm; and
- the mean sphere has a variation normalized to the addition, in any segment of the meridian line between the prism reference point and the far-vision reference point, which is less than or equal to 0.08.

A first advantage of a lens according to the invention results from the variation in mean sphere of the complex surface along the meridian line. Thanks to this variation, which is small between the prism reference point and the far-vision reference point, the far-vision area extends lower down in the lens. Thus, the wearer benefits from a correction that is adapted for his far vision, even for remote objects located at an intermediate distance. Thus, starting the progression at a low level in the lens gives the wearer an easy view of the ground. In this way, the lens wearer may have a satisfactory view of a golf ball on the ground, or may see the path just in front of him correctly when he is walking.

A second advantage of a lens according to the invention results from the cylinder of the complex surface that has limited values over the entire surface of the lens. Thanks to these low cylinder values, the unintentional astigmatism of the lens is small, even in lateral portions of the lens that are close to its peripheral edge. The wearer thus benefits from satisfactory vision through the entire lens. In other words, the lens wearer has far vision through the lens that is clear-cut, not only horizontally on the right and left sides but also vertically downwards. In addition, the absence of rebound in the mean sphere on the circle of radius 20 mm centered on the prism reference point guarantees that the variations in the optical power do not disturb the peripheral vision in the lateral portions of the lens. This clear-cut far-vision quality and good peripheral vision quality furthermore give the wearer good dynamic vision. In particular, any pitching sensation that might be felt when he changes his line of sight through the lens is very greatly reduced, or even completely absent.

A third advantage results from the limited progression length. Thanks to this rather short progression length, the lens has an optical power adapted for the wearer's near vision at points on the meridian line that are not located too far below the fitting cross. In other words, the area of the lens adapted for correcting the wearer's near vision is not located too low in the lens. Thus, the near-vision area is easily and rapidly accessible for the wearer, whilst still enabling him to see the ground through the intermediate-vision area without forcing him to take up an uncomfortable posture.

According to an improvement of the invention, the mean sphere may have absolute variations that are less than 0.25 diopter in a segment of the meridian line at least 5 millimeters in length, which extends from the near-vision reference point toward the lower edge of the lens. In other words, the lens gives the wearer a vertically extended near-vision area, in which the optical power is substantially constant. This results in good near-vision comfort, especially since the wearer has available a sufficient interval within which he can vary the line of his sight while still retaining viewing conditions that are adapted to his near vision. This comfort enables him in particular to scan the screen of his mobile telephone vertically without impediment.

The invention also provides a method of producing an ophthalmic lens as described above, which is intended for an identified wearer. This method comprises the following steps:

(1) an optical power value for far vision and an addition value, which are prescribed for the wearer, are obtained;

(2) a reduced addition, equal to the addition prescribed for the wearer less an amount of between 0.75 diopter and 1.25 diopters, is obtained;

(3) a lens design is determined on the basis of the prescribed far-vision optical power value and the reduced addition value; and (4) the lens is produced in accordance with the determined design.

Such a method therefore includes a step of reducing the addition relative to the addition value initially prescribed for the wearer. The wearer can then benefit from even more clear-cut far vision, while still having a near-vision area enabling him to see close objects, at least during periods of short or moderate duration. The conditions for near vision through the lens are good enough for him to be able to read the time on his watch or to consult the screen of his mobile telephone.

BRIEF DESCRIPTION OF THE DRAWINGS

Other features and advantages of the present invention will become apparent in the following description of nonlimiting exemplary embodiments, and with reference to the appended drawings.

FIG. 2a-5a and 2b -5b correspond to FIGS. 1a and 1b, respectively, for other progressive ophthalmic lenses according to the invention having additions equal to 1.5 diopters, 2.0 diopters, 2.5 diopters and 3.0 diopters.

DETAILED DESCRIPTION

Figure 1B:
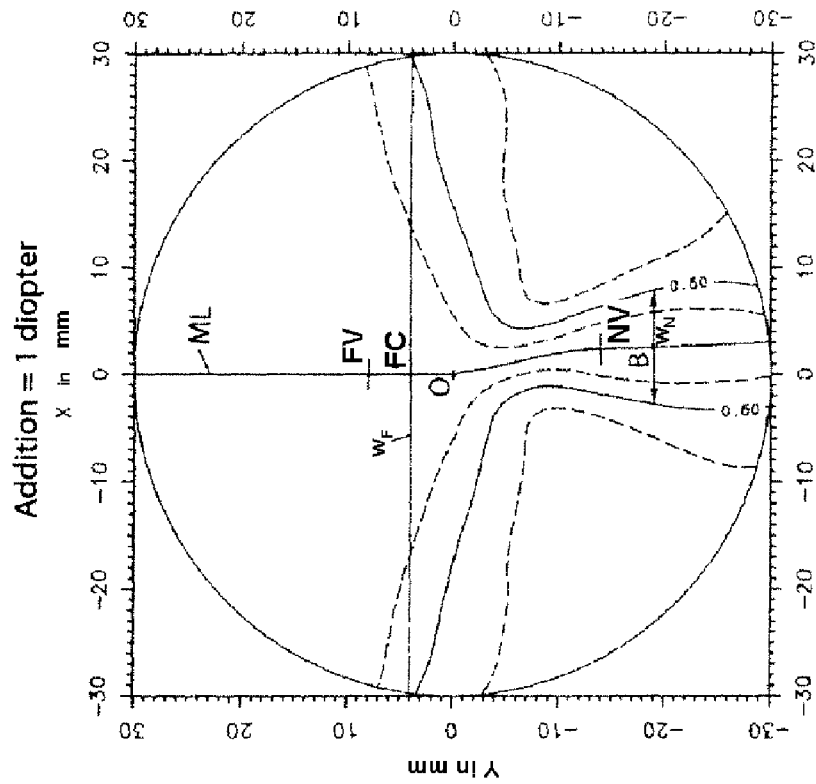
FIG. 1a and 1b are mean sphere and cylinder maps, respectively, for a progressive ophthalmic lens according to the invention having an addition of 1.0 diopter.
Figure 1A:
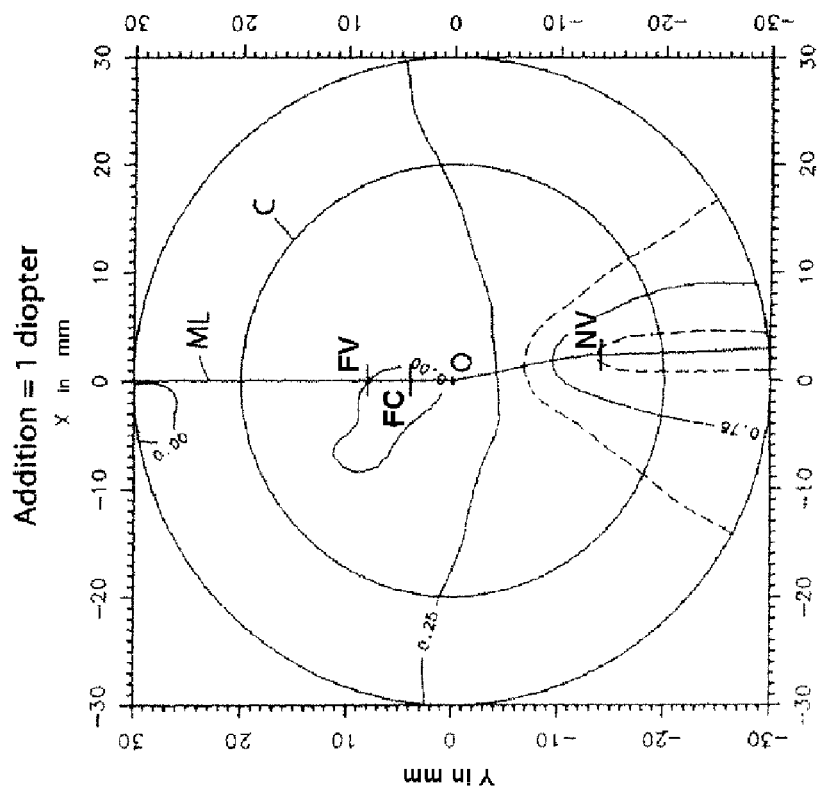
Figure 2A:
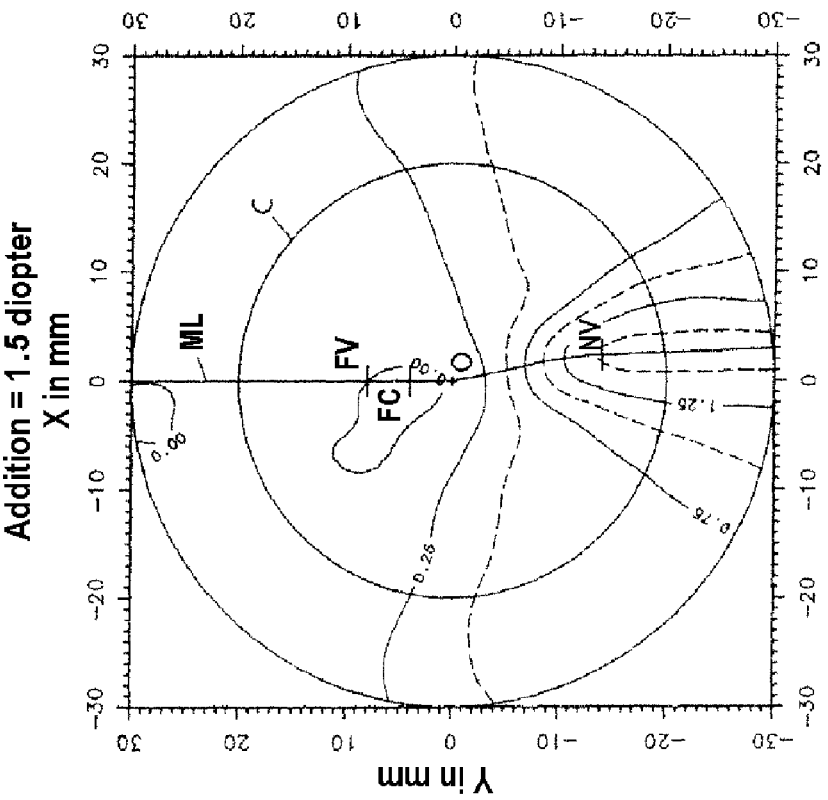
Figure 2B:
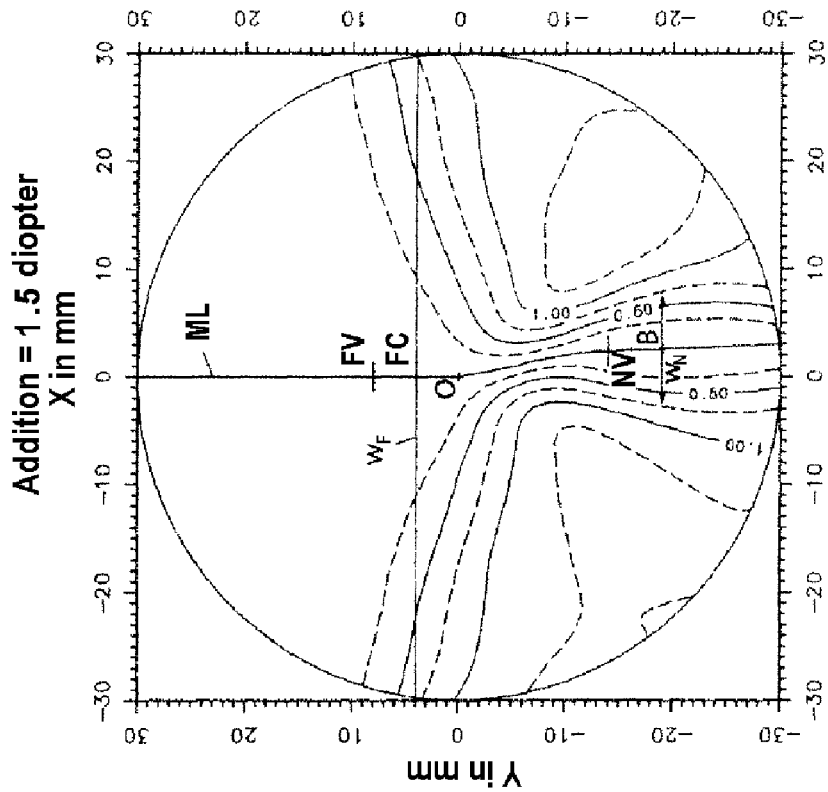
Figure 3B:
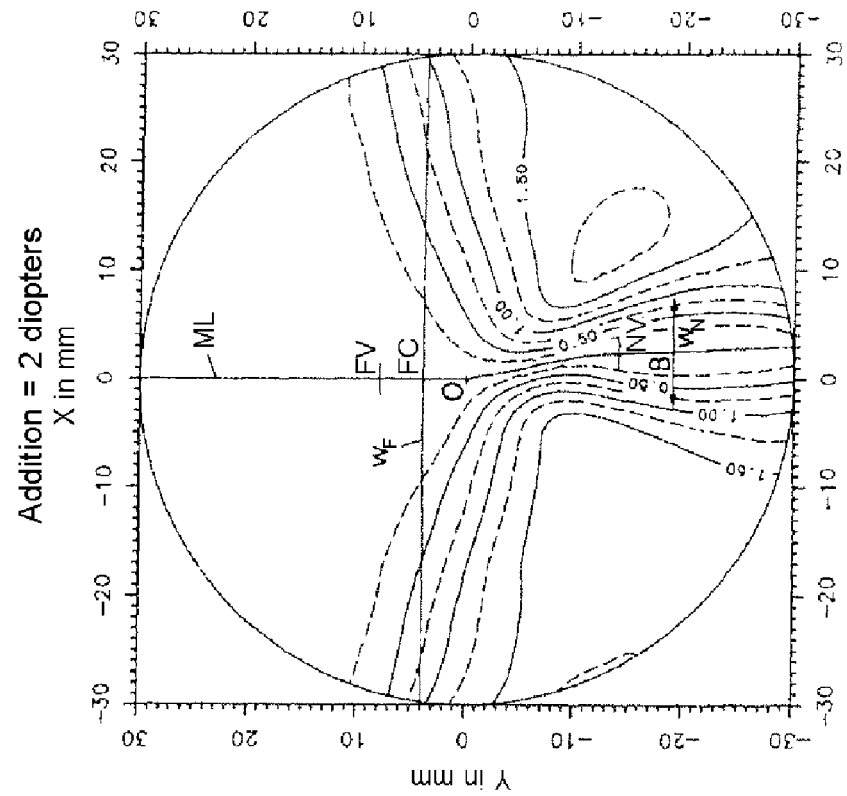
Figure 3A:
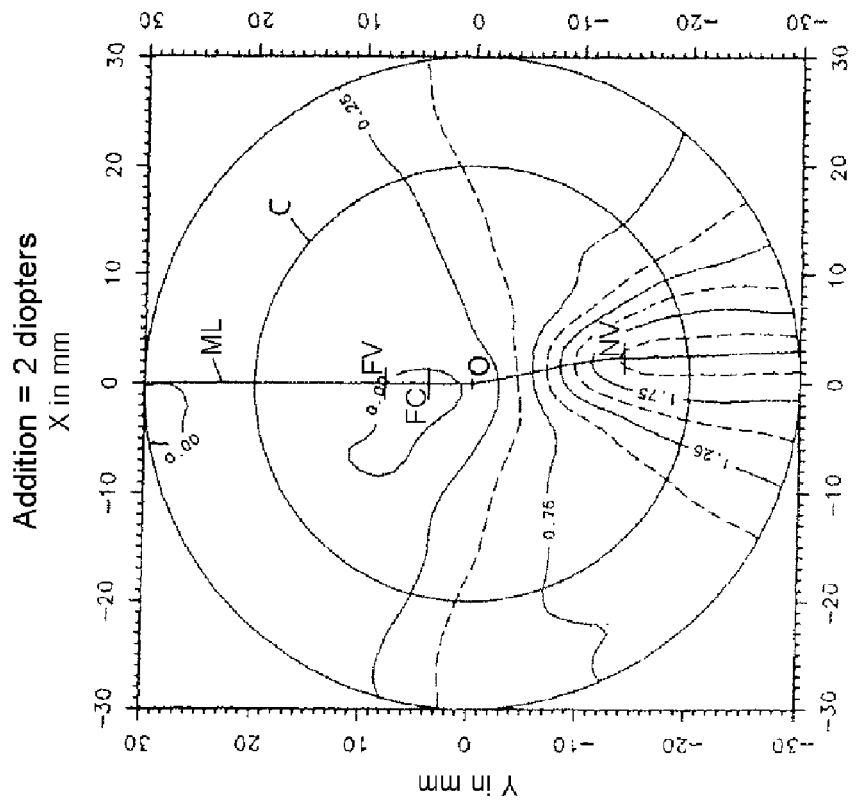
Figure 4B:
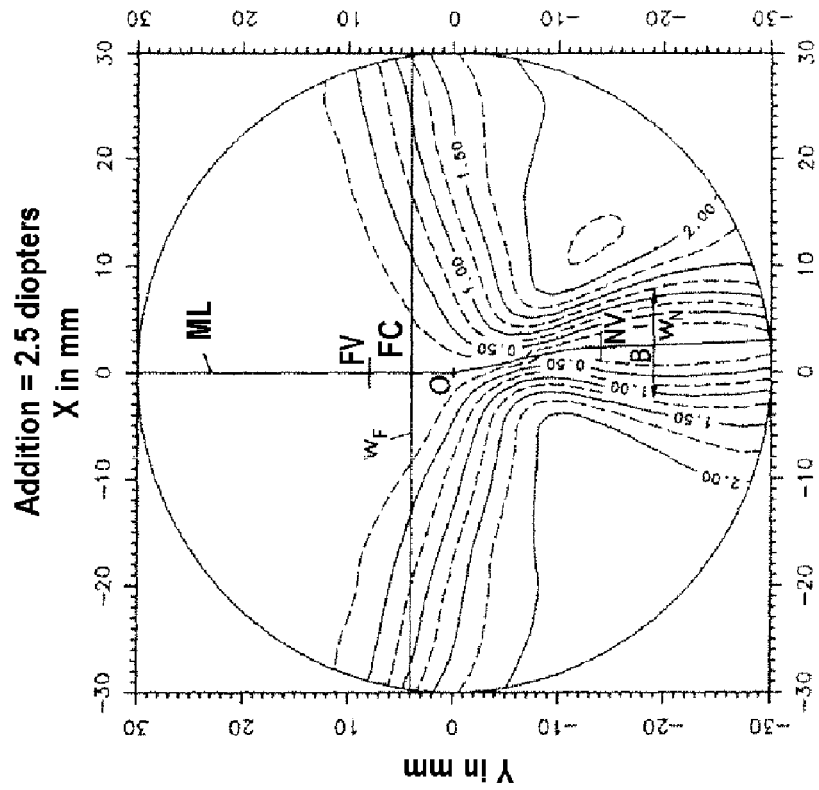
Figure 4A:
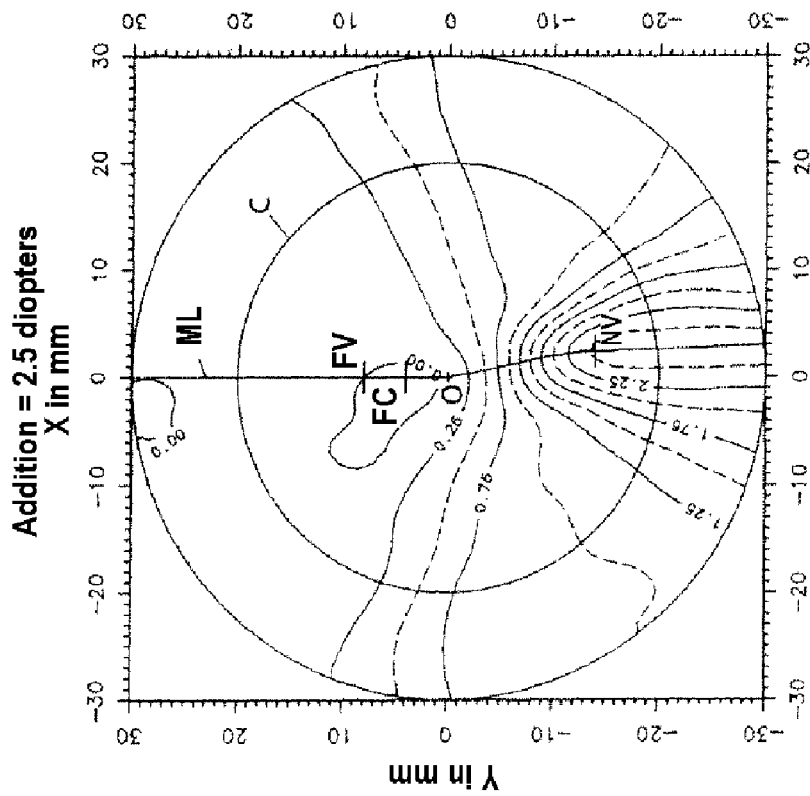
Figure 5B:
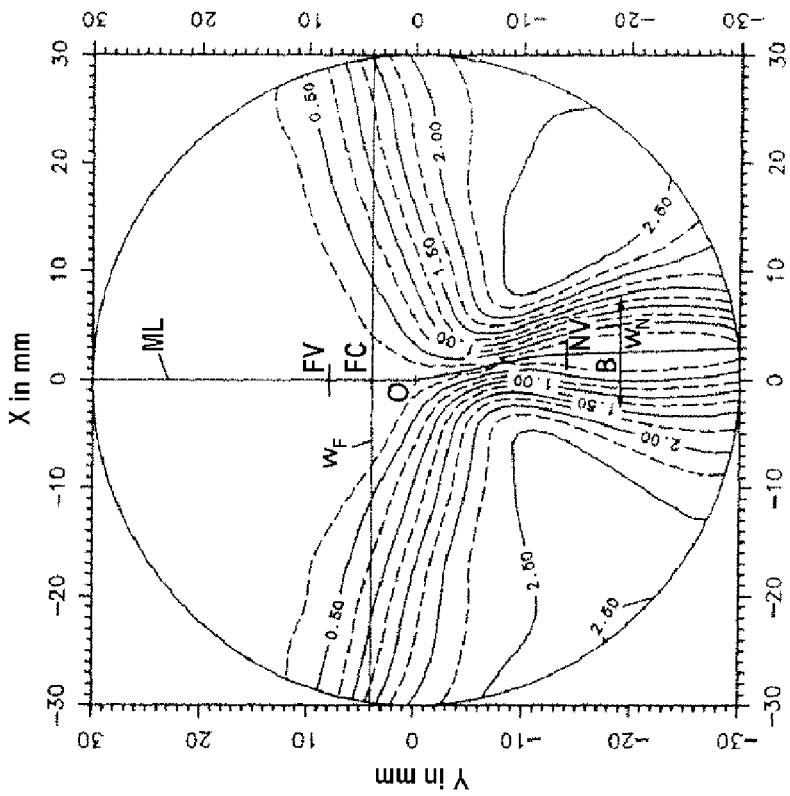
Figure 5A:
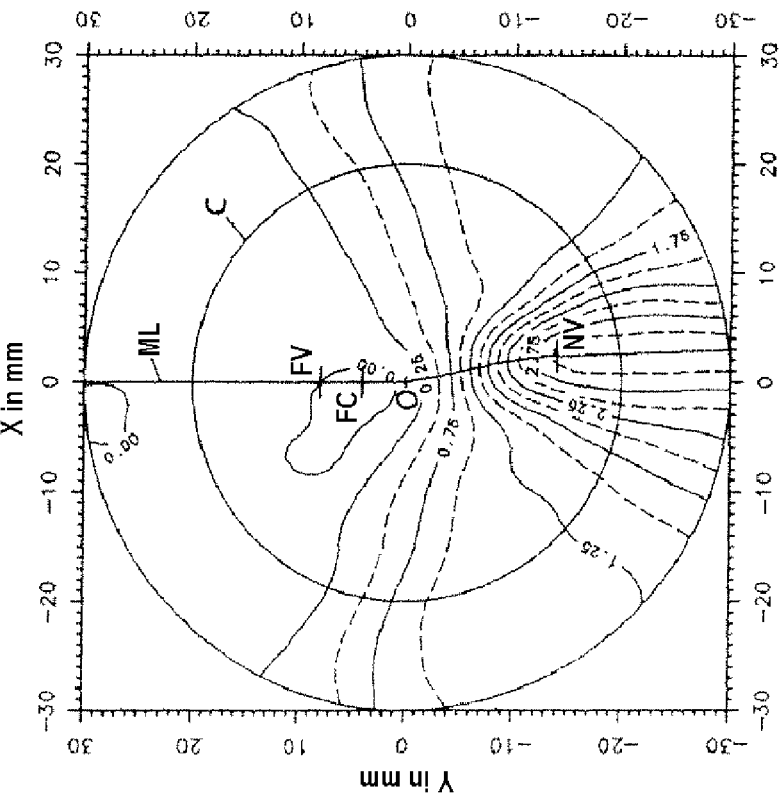

As is known, a spectacle lens has an anterior surface and a posterior surface. Between these two surfaces there is a refringent transparent medium, which is usually homogeneous. This may be a finished lens glass, the two surfaces of which have definitive shapes. It may therefore be a lens glass that has already been trimmed to the dimensions of a lens housing of the frame for a pair of spectacles. However, the finished lens glass may also be considered before it has been trimmed. Alternatively, it may be a semifinished lens glass, only one surface of which has a definitive shape and the other surface of which is intended to be subsequently machined according to the prescription of a wearer. Usually, the anterior surface of the semi-finished lens glass is the definitive surface and the posterior surface is that intended to be subsequently machined. In the present patent application, the term "ophthalmic lens" is understood to mean both a finished lens glass and a semifinished lens glass. When it has not been trimmed, the lens has a peripheral edge which is usually circular, for example with a diameter of 60 mm (millimeters). The anterior and posterior surfaces of the lens are thus designated in relation to their position when the lens is used by the wearer, after it has been fitted into the frame of a pair of spectacles and placed on the wearer's face.

In the context of the present description, it is assumed that the anterior surface of the progressive lenses that are considered has a complex surface shape. In other words, it has a mean sphere that varies continuously over this surface.

The following points are defined on the anterior surface of the lens, in a manner known to those skilled in the art:

the prism reference point, denoted by O, associated with a prism value of the lens;

a fitting cross, denoted by FC, which serves for vertically adjusting a position of the lens in relation to the center of the wearer's pupil;

a far-vision reference point, denoted by FV, associated with an optical power value suitable for correcting the wearer's vision when he is looking at a far object, typically located at more than two meters from him; and a near-vision reference point, denoted by NV, which is associated with an optical power value suitable for correcting the wearer's vision when he is looking at a near object, located at about forty centimeters from his eyes.

These reference and identification points are indicated by the lens manufacturer. They may either be communicated by the manufacturer in a notice supplied with the lens or they may be permanently etched or indicated by temporary tracing on the lens.

In the rest of the text, the terms "on", "under", "above", "below" and "lateral" are used to qualify portions of or points on the lens in relation to a reference position of the lens used by the wearer. This position corresponds to that with the wearer's head, provided with a frame in which the lens is fitted, being held vertically.

The anterior surface of the lens is then identified by two Cartesian axes expressed in millimeters: namely X for the horizontal axis and Y for the vertical axis, the positive direction of the Y axis being toward the top. Usually, the point O is the center of this coordinate system, the point FC having as coordinates X=0 and Y=4 mm, the far-vision point FV having as coordinates X=0 and Y=8 mm and the near vision point NV having as vertical coordinate Y=−14 mm. Therefore FV is located on a vertical line above 0 and NV is beneath O, but laterally offset (parallel to the X axis) in relation to FV. The offset of NV is reversed between a right lens and a left lens. A line ML, called the principal meridian line, connects the points FV, FC, O and NV. It corresponds to the trace on the lens of the line of sight when the wearer successively observes objects that are located in front of him at variable heights and at variable distances.

The addition of the lens is then defined as the difference between the mean sphere values of the anterior surface at the points NV and FV.

FIGS. 1a, 2a, 3a, 4a and 5a are mean sphere maps of the anterior surfaces of five separate lenses according to the invention. Each of these maps is bounded by the peripheral edge of the corresponding lens, and indicates the value of the mean sphere for each point on the anterior surface of this lens. The lines plotted on these maps are iso-sphere lines, which connect points on the anterior surface of each lens that correspond to a given mean sphere value. This value is indicated in diopters for some of these lines.

Similarly, FIGS. 1b, 2b, 3b, 4b and 5b are cylinder maps. The lines plotted on these maps are iso-cylinder lines, which connect points on the anterior surface of each lens that correspond to a given cylinder value.

Formulae 1a and 1b indicated above are mathematical expressions for the mean sphere and for the cylinder.

The cylinder maps 1b-5b show that, for each lens, the value of the cylinder at any point on its anterior surface, divided by the addition value of this lens, is less than 1.0. Thus, in FIG. 1b, the cylinder values of the 1.0 diopter addition lens are all less than 1 diopter, in FIG. 2b, the cylinder values of the 1.5 diopter addition lens are all less than 1.5 diopters, and so on for FIGS. 3b, 4b and 5b.

Moreover, a circle C is traced on the mean sphere maps of FIGS. 1a-5a, which has the point O as center and a radius of 20 mm. The mean sphere values that appear on the circle C decrease in a regular manner from the intersection of this circle with the meridian line ML in the lower portion of the lenses (Y<0) toward the intersection of the same circle C with the meridian line ML in the upper portion of the lenses (Y>0). In other words, the mean sphere has no rebound on the circle C on either side of the meridian line, thereby ensuring that the optical characteristics of the lens vary gently and uniformly. This results in good peripheral dynamic vision. The inventors remind the reader that a rebound in the mean sphere normalized to the addition of the lens, when said rebound is present on the circle C, appears on either the right or left lateral side, or on both lateral sides of the lens. The rebound height is then calculated as the difference, divided by the addition, between the mean sphere values obtained respectively at two local extrema on the mean sphere that are located between the absolute maximum and the absolute minimum of the mean sphere on the circle C.

Figure 6:
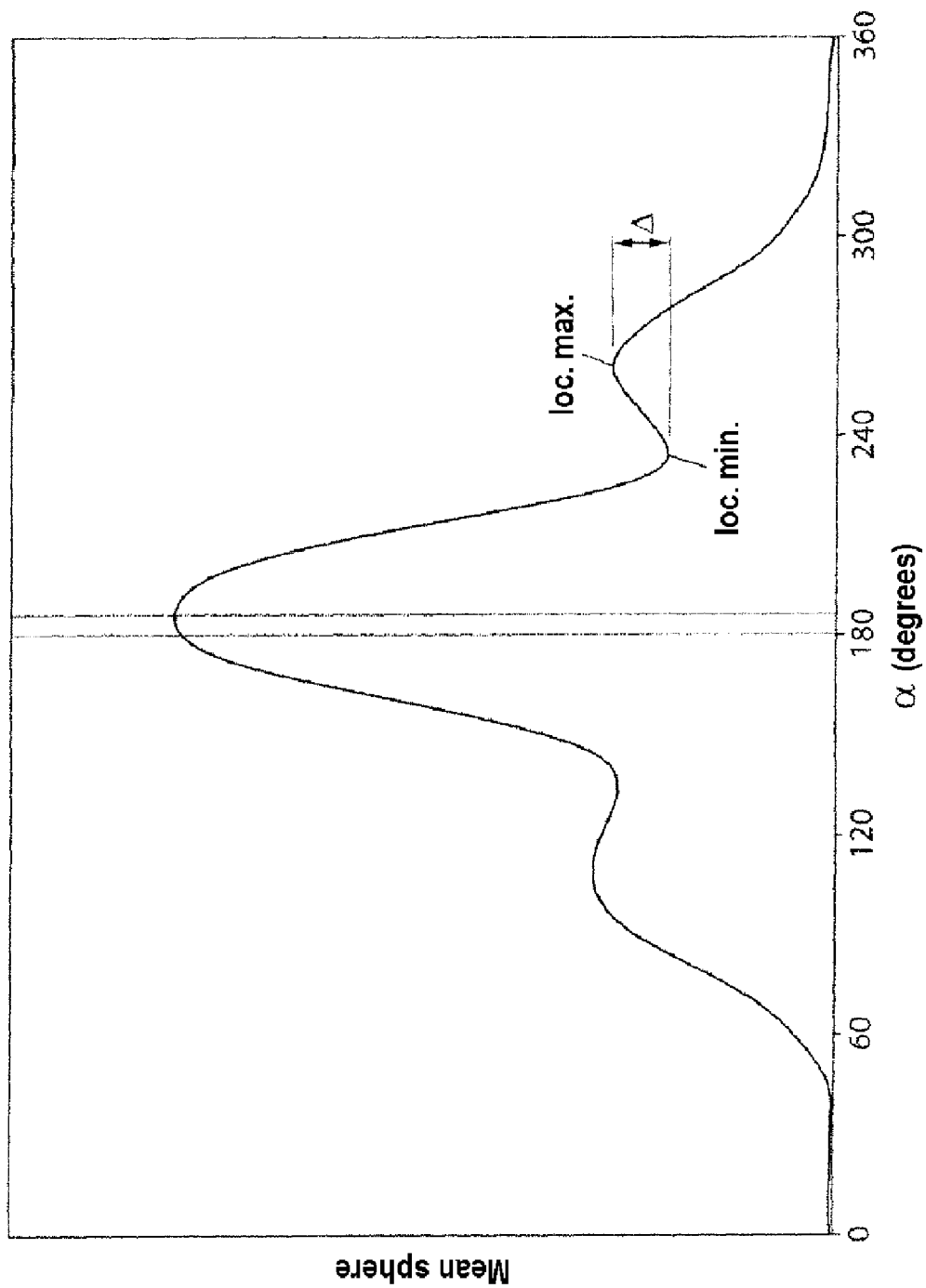
Fig. 6 illustrates the amount of rebound in question for the lenses according to the invention.

FIG. 6 illustrates the principle of how such a rebound is determined, such that this is excluded by the present invention. This figure shows variations in the mean sphere of the complex surface along the circle C. The X-axis of the graph in FIG. 6 plots displacements on the circle C through values of a polar angle α defined from the vertical half-axis starting from the point O and directed toward the upper edge of the lens. The mean sphere has an absolute minimum for the zero value of α, which corresponds to the far-vision area. It has an absolute maximum for a value of α that is close to but offset in relation to 180 degrees, and corresponds to the near-vision area. A local minimum and a local maximum of the mean sphere, which are denoted by loc.min. and loc.max. respectively, are present between these values of α. Δ is the difference between the mean sphere values obtained at this local maximum and at this local minimum, respectively. The rebound in mean sphere normalized to the addition is then the quotient of Δ divided by the addition of the complex surface.

The following table gives the mean sphere values of the anterior surfaces of the appended figures, which correspond to the points O and FV:

| FIG. | Addition | Sph (FV) | Sph (O) | ΔSph/Addition |
|------|----------|----------|---------|---------------|
| 1a | 1 diopter | 4.74 | 4.76 | 0.02 |
| 2a | 1.5 diopters | 4.74 | 4.77 | 0.02 |
| 3a | 2 diopters | 4.74 | 4.78 | 0.02 |
| 4a | 2.5 diopters | 4.74 | 4.79 | 0.02 |
| 5a | 3 diopters | 4.74 | 4.79 | 0.017 |

The numerical values given in this table correspond to lenses that are made of one and the same transparent homogeneous material with a refractive index n equal to 1.591.

The last column in the above table indicates the variation in mean sphere normalized to the addition, which is calculated between the points O and FV, namely ΔSph/Addition=|Sph(O)−Sph(FV)|/Addition, where |·| denotes the absolute value. This quantity is less than 0.08 in all cases. It also remains less than 0.08 irrespective of the pair of points considered along the line ML between the points O and FV for determining the mean sphere. Advantageously, the quantity ΔSph/Addition is less than or equal to 0.05, preferably less than or equal to 0.04, between the points O and FV along the line ML, and also in any segment of this line lying between these points.

Finally, the mean sphere maps in FIGS. 1a-5a show that the corresponding lenses have respective progression lengths that are less than or equal to 15 mm.

It may be advantageous for the mean sphere normalized to the addition to have limited spatial variations in certain portions of the lens glass, so as to improve the lens wearer's dynamic vision while still maintaining good near-vision accessibility. Thus, the mean sphere normalized to the addition may have a maximum slope of between 0.09 mm$^{-1}$ and 0.11 mm$^{-1}$ along the meridian line and/or a sphere gradient of less than or equal to 0.9 mm$^{-1}$ along the circle C.

The general shape of the far-vision and near-vision areas of the lenses according to the invention may be visualized from the cylinder maps (FIGS. 1b-5b). In the case of the lenses shown in the appended figures, two iso-cylinder lines associated with a given cylinder value on each side of the meridian line ML form a constriction between the points O and NV. In other words, they have an hourglass profile with progressive splaying, which increases from around the point NV toward the lower edge of the lens. This profile ensures that the near-vision area is wide enough to provide the wearer with good comfort when he is looking at a close object through the lower portion of the lens.

Furthermore, the far-vision area of each lens shown in the appended figures may have a width $w_F$ of greater than 52 mm at the fitting cross FC (see the maps of FIGS. 1b-5b). This width $w_F$ is equal to the distance measured along a horizontal straight line passing through the fitting cross FC between the two iso-cylinder lines located on each side of the meridian line ML and corresponding to a cylinder value equal to one half of the addition. Preferably, the width $w_F$ of the far-vision area may be greater than 56 mm at the fitting cross FC.

In fact, to obtain a widened far-vision area and gentle gradients that give good peripheral vision, it may be advantageous to adjust the design of the complex surface by reducing the width $w_N$ of the near-vision area. Thus, the width $w_N$ of the near-vision area is advantageously less than 14 mm at a point B on the meridian line located at 5 mm below the near-vision reference point NV (see the maps of FIGS. 1b-5b). The width $w_N$ is equal to the distance measured on a horizontal straight line that passes through the point B between two iso-cylinder lines located on each side of the meridian line ML and corresponding to a cylinder value equal to one half of the addition. More advantageously, $w_N$ is less than 12 mm and preferably is between 10 mm and 11.5 mm. The far-vision area may then be particularly large, extending further from each side of the meridian line ML toward the bottom of the lens.

Several ways of assigning a lens as described above to an initially identified wearer will now be described. Firstly, an optical prescription for the wearer is obtained, which specifies in particular a mean optical power value for far vision, optionally with astigmatism characteristics and an addition value. These values and characteristics are established in relation to one or more visual defects found in the wearer. The lens may then be produced from a semifinished lens glass selected from a series of available models and corresponding to various addition values.

According to the usual method of selecting the semi-finished lens glass, this is chosen so as to have a complex surface, the addition of which is approximately equal to the addition prescribed for the wearer. The posterior surface of the semifinished lens glass is then machined in order to obtain, at the far-vision point, approximately the optical power prescribed for far-vision, and also the possible prescribed astigmatism correction. In this case, the lens supplied to the wearer has an optical power at the near-vision point that compensates for his near-vision visual defect.

According to an alternative method proposed by the present invention, the lens supplied to the wearer may be determined from prescribed values, by reducing the addition value. To do this, a reduced addition is calculated for the wearer, this being equal to the prescribed addition less an amount lying between 0.75 diopter and 1.25 diopters. For example, the reduced addition may be equal to the addition prescribed for the wearer less 1.0 diopter. It may also be determined in a more complicated manner, especially by applying addition corrections that differ depending on the addition value prescribed for the wearer. To give an example, the reduced addition may be calculated by applying the following formula when the prescribed addition is greater than or equal to 1.5 diopters: Add_red=$\alpha$×Add_presc−$\beta$, where Add_red denotes the reduced addition, Add_presc denotes the prescribed addition, $\alpha$ is a first constant lying between 0.90 and 1.05, and $\beta$ is a second constant lying between 0.75 diopter and 0.85 diopter. Furthermore, when the prescribed addition is less than 1.5 diopters, the reduced addition may have a constant value lying between 0.5 diopter inclusive and 0.75 diopter inclusive. When a reduced addition value is used, the wearer will have a larger far-vision area in the upper portion of the lens relative to a lens having the prescribed addition value, while still having a visual correction in the lower portion of the lens that will enable him nevertheless to observe close objects.

Irrespective of the method of selecting the addition of the lens, approximately equal to the prescribed addition or reduced relative thereto, a lens design is then determined from the optical power value prescribed for the far vision and from the prescribed or reduced addition value. This lens design may be determined, in particular, by taking into account the behavioral characteristics of the wearer and/or the characteristics describing the way the lens is worn by the wearer. The behavioral characteristics of the wearer may especially be a propensity of the wearer to rotate his eyes more than his head when looking in succession in different directions. The characteristics defining how the lens is worn may depend in particular on the spectacle frame chosen by the wearer. They may include, in particular, a distance between the pupil of the eye and the posterior surface of the lens, a pantoscopic angle, etc.

The lens is then produced, in a known manner, for example by machining the rear surface of a semifinished lens glass that corresponds to the design selected for the wearer and to the prescribed or reduced addition.

Of course, although the appended figures illustrate the invention for five addition values, the present invention may be implemented with any addition values. Finally, the invention may be used both for a myopic wearer and for a hypermetropic wearer or an astigmatic wearer, by adapting the optical power value or the astigmatism value at the far-vision reference point.

The invention claimed is:

1. A progressive ophthalmic lens comprising a complex surface, a prism reference point (O) and a fitting cross (FC), and suitable for being placed in front of a wearer's eye so that a scan along the wearer's line of sight through the lens defines a meridian line (ML) corresponding to a trace of the intersection of said line of sight with said surface, said meridian line connecting an upper edge of the lens to a lower edge, passing through a far-vision reference point (FV), the fitting cross, the prism reference point and a near-vision reference point (NV), the fitting cross (FC) being located at 4 mm above the prism reference point (O) and the near-vision reference point (NV)

being located at 14 mm below said prism reference point (O), and the complex surface having a power addition between the far-vision reference point (FV) and the near-vision reference point (NV) and having:
- (i) a cylinder value normalized to the addition of less than 1.0 over the entire complex surface of the lens;
- (ii) a mean sphere normalized to the addition, having no rebound on a circle of radius 20 mm centered on the prism reference point (O); and
- (iii) a progression length of less than or equal to 15 mm, said progression length being the distance measured vertically between the fitting cross (FC) and a point on the meridian line for which the mean sphere has a difference of 85% of the addition relative to the far-vision reference point, the lens being further characterized in that:
- (iv) the mean sphere of the complex surface has a variation normalized to the addition, in any segment of the meridian line (ML) between the prism reference point (O) and the far-vision reference point (FV), of less than or equal to 0.08.

2. The lens as claimed in claim 1, in which the mean sphere of the complex surface has a variation normalized to the addition, in any segment of the meridian line (ML) between the prism reference point (O) and the far-vision reference point (FV), of less than or equal to 0.05, preferably less than or equal to 0.04.

3. The lens as claimed in claim 1 or 2, in which the mean sphere normalized to the addition, for said complex surface, has a maximum slope of between 0.09 mm$^{-1}$ and 0.11 mm$^{-1}$ along the meridian line (ML).

4. The lens as claimed in any one of the preceding claims, in which the mean sphere normalized to the addition, for said complex surface, has a gradient of less than or equal to 0.9 mm$^{-1}$ along the circle of radius 20 mm centered on the prism reference point (O).

5. The lens as claimed in any one of the preceding claims, in which the mean sphere of the complex surface has absolute variations of less than 0.25 diopter in a segment of the meridian line (ML) at least 5 millimeters in length and extending from the near-vision reference point (NV) toward the lower edge of the lens.

6. The lens as claimed in any one of the preceding claims, in which the complex surface has a near-vision area width of less than 14 mm at a point B on the meridian line located at 5 mm below the near-vision reference point (NV), the width of the near-vision area at said point B being equal to the distance measured on a horizontal straight line passing through the point B between two iso-cylinder lines located on each side of the meridian line (ML) and corresponding to a cylinder value equal to one half of the addition.

7. The lens as claimed in claim 6, in which the width of the near-vision area of the complex surface at the point B is less than 12 mm, and preferably between 10 mm and 11.5 mm.

8. The lens as claimed in any one of the preceding claims, in which the complex surface has a far-vision area width of greater than 52 mm at the fitting cross (FC), the width of the far-vision area at said fitting cross being equal to the distance measured along a horizontal straight line passing through said fitting cross, between two iso-cylinder lines located on each side of the meridian line (ML) and corresponding to a cylinder value equal to one half of the addition.

9. The lens as claimed in claim 8, in which the width of the far-vision area of the complex surface is greater than 56 mm at the fitting cross (FC).

10. A method of producing an ophthalmic lens as claimed in any one of the preceding claims, intended for an identified wearer, said method comprising the following steps:
- (1) an optical power value for far vision and an addition value, which are prescribed for said wearer, are obtained;
- (2) a reduced addition, equal to the addition prescribed for the wearer less an amount of between 0.75 diopter and 1.25 diopters, is obtained;
- (3) a lens design is determined on the basis of the prescribed far-vision optical power value and the reduced addition value; and
- (4) the lens is produced in accordance with the determined design.

11. The method as claimed in claim 10, in which the design of the lens is determined in step (3) by taking into account the characteristics selected from a propensity of the wearer to rotate his eyes rather than his head when looking in succession in different directions, a distance between the pupil of the eye and the posterior surface of the lens, and a pantoscopic angle.

12. The method as claimed in claim 10 or 11, in which the reduced addition is equal to the addition prescribed for the wearer less 1.0 diopter.

13. The method as claimed in claim 10 or 11, in which the reduced addition is obtained from the addition prescribed for the wearer, in the following manner:
when the prescribed addition is equal to or greater than 1.5 diopters: by applying the formula Add_red=α×Add_presc−β, where Add_red denotes the reduced addition, Add_presc denotes the prescribed addition, α is a first constant lying between 0.90 and 1.05, and β is a second constant lying between 0.75 diopter and 0.85 diopter; and
when the prescribed addition is less than 1.5 diopters, taking a constant value for said reduced addition, said value being between 0.5 diopter inclusive and 0.75 diopter inclusive.

* * * * *